United States Patent [19]

Gill et al.

[11] Patent Number: 5,561,570

[45] Date of Patent: Oct. 1, 1996

[54] DYNAMICALLY LOADED SUSPENSION FOR CONTACT RECORDING

[75] Inventors: William D. Gill, Palo Alto, Calif.; Bernhard Hiller, Erlangen-Buchenhof, Germany; Erhard T. Schreck, San Jose, Calif.

[73] Assignee: International Business Machines Corporation, Armonk, N.Y.

[21] Appl. No.: 348,772

[22] Filed: Nov. 30, 1994

Related U.S. Application Data

[63] Continuation of Ser. No. 23,528, Feb. 26, 1993, abandoned.

[51] Int. Cl.$^6$ .................................................. G11B 21/24
[52] U.S. Cl. .................................................................. 360/104
[58] Field of Search ........................................ 360/102, 103, 360/104, 105, 106, 97.01, 97.02, 122

[56] References Cited

U.S. PATENT DOCUMENTS

| | | | |
|---|---|---|---|
| 2,937,240 | 5/1960 | Harker | 360/103 |
| 4,141,049 | 2/1979 | Watrous | 360/103 |
| 4,769,727 | 9/1988 | Mao | 360/103 |
| 4,819,091 | 4/1989 | Brezoczky et al. | 360/97.01 |
| 4,884,155 | 11/1989 | Spash | 360/105 |
| 5,041,932 | 8/1991 | Hamilton | 360/104 |
| 5,166,845 | 11/1992 | Thompson et al. | 360/103 |
| 5,235,484 | 8/1993 | Maruyama | 360/104 |

FOREIGN PATENT DOCUMENTS

| | | | |
|---|---|---|---|
| 0025826 | 4/1981 | European Pat. Off. | 360/104 |
| 0508565 | 10/1992 | European Pat. Off. | 360/122 |
| 53-118115 | 10/1978 | Japan | 360/103 |
| 53-147520 | 12/1978 | Japan | 360/103 |
| 55-70969 | 5/1980 | Japan | 360/105 |
| 61-260482 | 11/1986 | Japan | 360/104 |
| 61-260483 | 11/1986 | Japan | 360/103 |
| 61-260484 | 11/1986 | Japan | 360/103 |

*Primary Examiner*—Stuart S. Levy
*Assistant Examiner*—William J. Klimowicz
*Attorney, Agent, or Firm*—James C. Wilson

[57] ABSTRACT

The present invention mounts a contact recording transducer/suspension assembly over a magnetic recording disk such that the rotation of the disk creates an additional dynamic loading to counteract the lift-off forces generated by rotation of the disk. As the rotation rate of the disk is increased and lift-off forces grow, so do the offsetting dynamic loads created by the transducer/suspension assembly. Optionally, the cross section of the transducer/suspension assembly is modified to further improve this dynamic loading effect.

The present invention mounts the transducer/suspension assembly in a contact recoding disk file so as to place the assembly in compression once disk rotation is initiated. The assembly is mounted so that the frictional force between the assembly and the disk "pushes" the assembly against its mounting instead of applying a "pulling" force on the assembly.

4 Claims, 5 Drawing Sheets

DYNAMICALLY LOADED SUSPENSION FOR CONTACT RECORDING

This is a continuation of application Ser. No. 08/023,528, filed Feb. 26, 1993, now abandoned.

TECHNICAL FIELD

The present invention relates generally to rotating magnetic storage devices and their recording elements and more particularly to the slider assembly of a contact recording storage device.

BACKGROUND OF THE INVENTION

Conventional magnetic disk drives are information storage devices which utilize at least one rotatable magnetic media disk with concentric data tracks, a read/write transducer for reading the data from or writing the data to the various tracks, an air bearing slider for holding the transducer adjacent to the track generally in a flying mode above the media, a suspension for resiliently holding the slider and the transducer over the data tracks, and a positioning actuator connected to the transducer/suspension combination for moving the transducer across the media to the desired data track and maintaining the transducer over the data track during a read or a write operation.

The suspension is required to maintain the transducer and the slider adjacent to the data surface of the disk with a low controlled loading force. The actuator positions the transducer over the correct track according to the data desired on a read operation or to the correct track for placement of the data during a write operation. The actuator positions the transducer over the correct track by shifting the transducer/suspension combination generally transverse to the track.

The air bearing slider supports the transducer above the disk with a cushion of air that is generated by the rotating disk. Because the recording density of a magnetic disk drive is limited by the height of this air cushion between the transducer and the media, a goal of air bearing slider design is to "fly" the slider as close as possible to the magnetic media while avoiding physical impact with the media.

Alternatively, the transducer may operate in contact with the disk. Touching the media presents unique problems in wear and, during operation of the disk file, the possibility of a catastrophic impact between the transducer and an asperity on the media. To minimize these problems, it has been recognized that the loading force on the suspension system must be reduced to a low level. A variety of mechanisms have been disclosed which attempt to implement such a contact recording disk file. Structured to work in a perpendicular recording environment, these devices permit the head and suspension to be easily manufactured. U.S. Pat. Nos. 5,041,932; 5,073,242; and 5,111,351 entitled "Integrated Magnetic Read/Write Head/Flexure/Conductor Structure" granted to Harold J. Hamilton disclose an integral magnetic transducer/suspension structure having the form of an elongated dielectric flexure or suspension body with a magnetic read/write transducer embedded at one end. Integral transducer/suspension assemblies of this general form are sometimes referred to as "reed" devices because of their rough similarity in shape to a reed for a musical instrument. In a preferred embodiment, Hamilton discloses an elongated, dielectric flexure body of aluminum oxide having a magnetic pole structure and helical coil integrally formed at one end of the flexure body with embedded copper conductor leads running the length of the flexure body to provide electrical connection for the transducer. The integral structure is fabricated utilizing conventional vapor deposition and photolithography techniques.

As noted above, contact recording permits higher recording densities unaffected by variations in flying height. The rate at which such recorded data can be read from or written to the magnetic recording device is inherently limited by the rate at which the magnetic media spins. Higher rotation rates are desirable since they result in faster access to data. Unfortunately, high spin rates in combination with the low static load of a contact recording transducer/suspension assembly can cause the transducer to lose contact with the magnetic media. This phenomena is known as "lift-off" of the transducer from the media. The linear speed at which the lift-off occurs is known as the lift-off velocity. For a given disk rotation rate, the lift-off problem is more severe at the outer radius of the disk where the highest relative linear velocity between the media and the transducer is experienced.

This lift-off problem is typically addressed by increasing the static load on the suspension assembly and thereby increasing the force that maintains the transducer in contact with the media. This solution has the undesirable effect of increasing the wear caused by the sliding contact of the transducer and the disk surface. High wear rates limit the useful life of the magnetic disk drive and, if high enough, may render the device impractical. Furthermore, increased suspension loading increases the likelihood that contact with a disk asperity will damage the transducer/suspension assembly. In addition, increased static load on the suspension increases the stiction force between the transducer and the media at zero velocity. Overcoming this force during the start of disk rotation can damage the disk and the transducer/suspension assembly. For the foregoing reasons, there is a need for an apparatus that addresses the lift-off problem created at high rotation rates without increasing the suspension loading force.

SUMMARY OF THE INVENTION

The present invention is directed to an apparatus that satisfies this need by mounting the transducer/suspension assembly such that the rotation of the disk creates an additional dynamic loading to counteract the lift-off forces generated by rotation of the disk. As the rotation rate of the disk is increased and lift-off forces grow, so do the offsetting dynamic loads created by the transducer/suspension assembly. Optionally, the cross section of the transducer/suspension assembly may be modified to further improve this dynamic loading effect.

More particularly, the present invention mounts the transducer/suspension assembly so as to place the assembly in compression once disk rotation is initiated. In other words, the frictional force between the assembly and the disk "pushes" the assembly against its mounting as opposed to prior art devices wherein the frictional force applied a "pulling" force on the assembly. In addition, the assembly is mounted such that above the media contact point the upper surface of the transducer/suspension assembly forms a small angle with respect to the disk surface. As this angle is increased the dynamic loading increases for a given rotation rate.

A disk drive having features of the present invention comprises a housing with at least one rigid data storage disk mounted in the housing. An actuator arm is positioned in the housing in proximity to the disk. Coupled to the actuator is a suspension assembly shaped to have a pad portion. The pad portion is positioned in contact with the data storage disk. A transducer, located near the pad, reads and writes data on the storage disk. Means are provided for rotating the disk such that a point on the rotating disk moves in the general direction from the pad toward the point where the suspension is coupled to the actuator. This places the suspension in compression and greatly increases the rate at which the disk can be rotated without causing the transducer/suspension assembly to lift-off.

This invention thus provides a contact recording transducer/suspension assembly which maintains contact with a storage disk even at high rotation rates without the deleterious effects of increasing the suspension's static load. Further features and advantages of the invention will become apparent from the following specification and the accompanying drawings.

DETAILED DESCRIPTION

Figure 1:
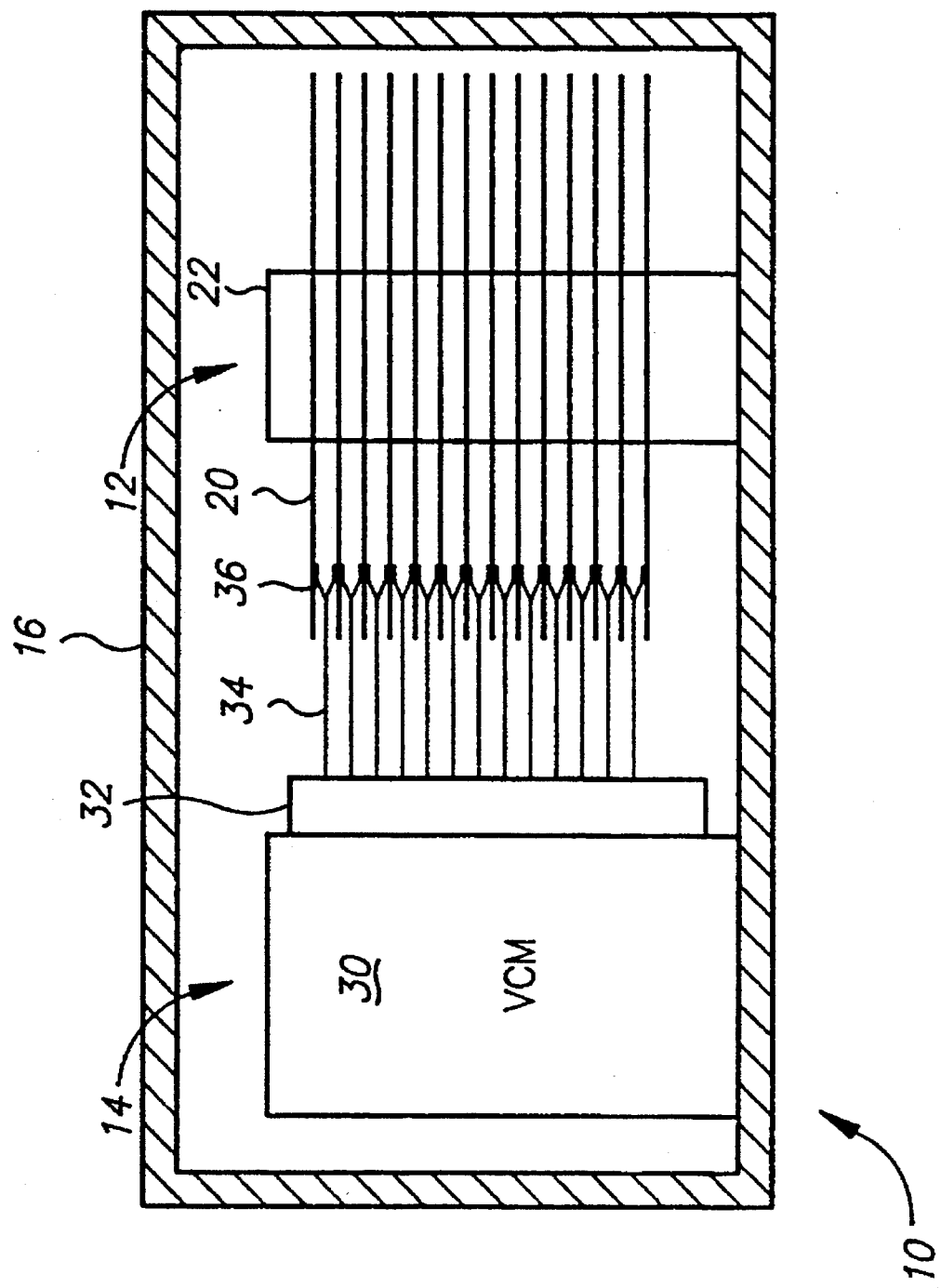
FIG. 1 is a schematic diagram of a disk drive system according to the present invention.

With reference to FIG. 1, a schematic diagram of a magnetic recording disk drive is illustrated and is designated by the general reference number 10. System 10 comprises a disk spindle assembly 12 and a head actuator assembly 14. Spindle assembly 12 and head actuator assembly 14 are located within a sealed housing 16 to prevent particulate contamination. Spindle assembly 12 comprises a plurality of magnetic recording disks 20 which are mounted to a spindle 22. Spindle 22 is rotated by an in-hub electrical motor which is not illustrated. Head actuator assembly 14 comprises a voice coil motor 30 which moves an actuator arm assembly 32 relative to the disks 20. Assembly 32 has a plurality of actuator arms 34, each of which is positioned in a space between two adjacent disks 20. Each actuator arm 34 has a pair of read/write heads 36. One head reads the disk positioned above the actuator arm 34 and the other reads the disk positioned below the actuator arm 34.

In operation, spindle 22 is rotated by the in-hub motor and motor 30 moves the actuator arms 34 between the disks 20 to the desired track location. One of the read/write transducers 36 then reads or writes data on the desired track.

Figure 2:
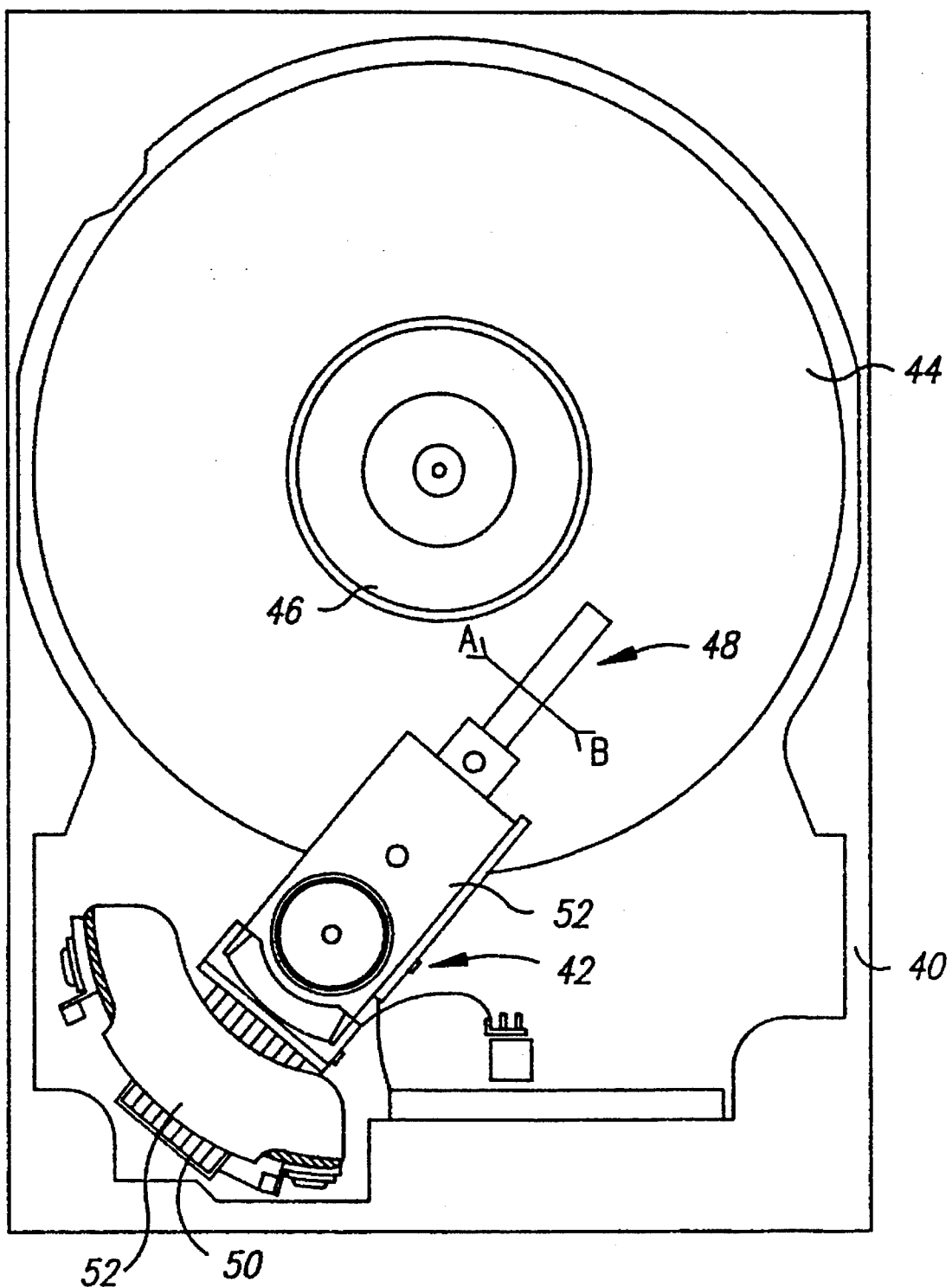
FIG. 2 is a top view of a magnetic recording mechanism with a rotary actuator and employing a reed transducer/suspension assembly in accordance with the present invention.

Referring now to FIG. 2, a data recording disk file useful for practicing the present invention is illustrated. The disk file includes a housing 40 in which is mounted a rotary actuator 42, an associated disk 44 and a drive means 46 for rotating the disk 44. The rotary actuator 42 moves a reed assembly 48 in an arcuate path over the disk 44. The rotary actuator 42 includes a voice coil motor, which comprises a coil 50 movable within the magnetic field of a fixed permanent magnet assembly 52. An actuator arm 54 is attached to the movable coil 50. The other end of the actuator arm 54 is attached to the combination transducer-suspension assembly 48.

Figure 3:
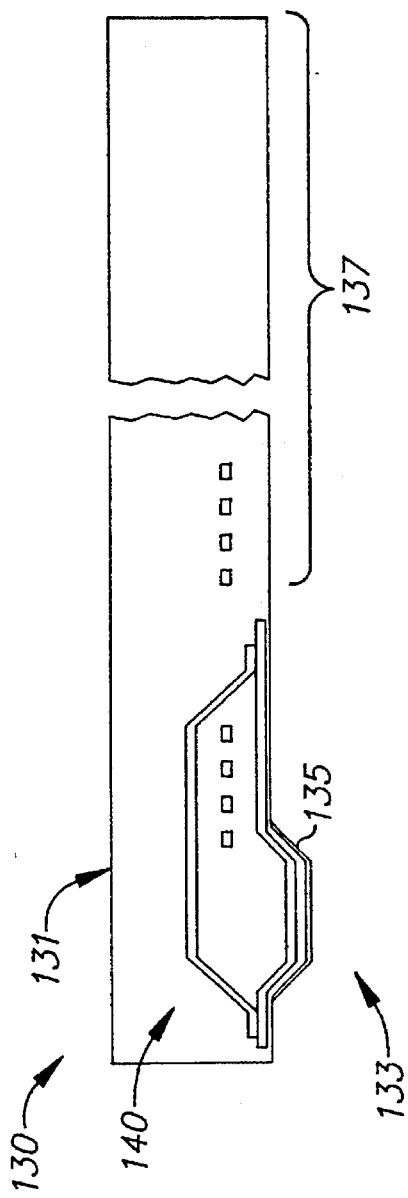
FIG. 3 is a cross-sectional view of one embodiment of a reed transducer/suspension assembly useful in practicing the present invention.

Referring now to FIG. 3, one embodiment of a suspension/transducer reed assembly useful for practicing the present invention is illustrated. The combination suspension/transducer-slider structure 130 comprises an elongated generally rectangular body of a dielectric material such as aluminum oxide ($Al_2O_3$) or silicon dioxide ($SiO_2$), for example, having a relatively uniform thickness along most of its length forming a suspension section 137 and a somewhat greater thickness at one end, the left end as illustrated, wherein a magnetic read/write transducer or head 140 is formed along with a slider on a lower side thereof. The term slider refers to the side of the assembly which is generally parallel to and adjacent the media surface in both Winchester-type disk files and contact recording applications.

As mentioned above, the reed structure 130 will lift-off from the disk surface if the rotational velocity of the disk is high enough. In this case a hydrodynamic air bearing will form between the disk surface and the slider. As shown in FIG. 3, the slider comprises a shaped protrusion 133 formed on the lower side of the reed assembly body 131. The surface of the shaped protrusion 133 is coated with a wear layer 135 of suitable material, such as diamond-like carbon, to minimize wear and damage when the reed assembly contacts the media surface. Although protrusion 133 as shown in the figures comprises a simple structure, other embodiments of the reed structure can include a multiple-stepped protrusion which allows the wear layer 135 to continue to provide wear protection to the slider surface even after the magnetic yoke poletips have been exposed, either by wear or by a post-fabrication lapping process intended to reduce the magnetic separation between the head and the disk surface caused by the thickness of the wear-resistance layer in the pole tip region.

The read/write head 140 is formed integrally with the suspension section 137 to provide the combination reed assembly 130. The read/write head 140 comprises a ring-type head utilized in horizontal recording applications, but can alternatively comprise a probe-type head for perpendicular recording applications.

In one embodiment, the combination reed assembly 130 comprises a body 131 of $Al_2O_3$ having a length of 9 to 12 millimeters (mm), a width of 0.5 mm and a thickness of 35 microns for that portion of the body 131 forming suspension section 137 and a thickness of 42 to 50 microns for the read/write head section 133. The reed assembly 130 is fabricated utilizing well-known deposition and photolithography techniques on a base substrate and is described in greater detail in IBM application Ser. No. 08/471,108 entitled "Integral Transducer-Suspension Assemblies for Longitudinal Recording" filed on Jan. 8th, 1993 and hereby incorporated by reference.

A detailed description of another contact recording mechanism useful for practicing the present invention can be found in U.S. Pat. No. 5,486,963 entitled "Integrated Transducer-Suspension Structure for Longitudinal Recording" filed on Aug. 19th, 1992 and hereby incorporated by reference.

Figure 4A:
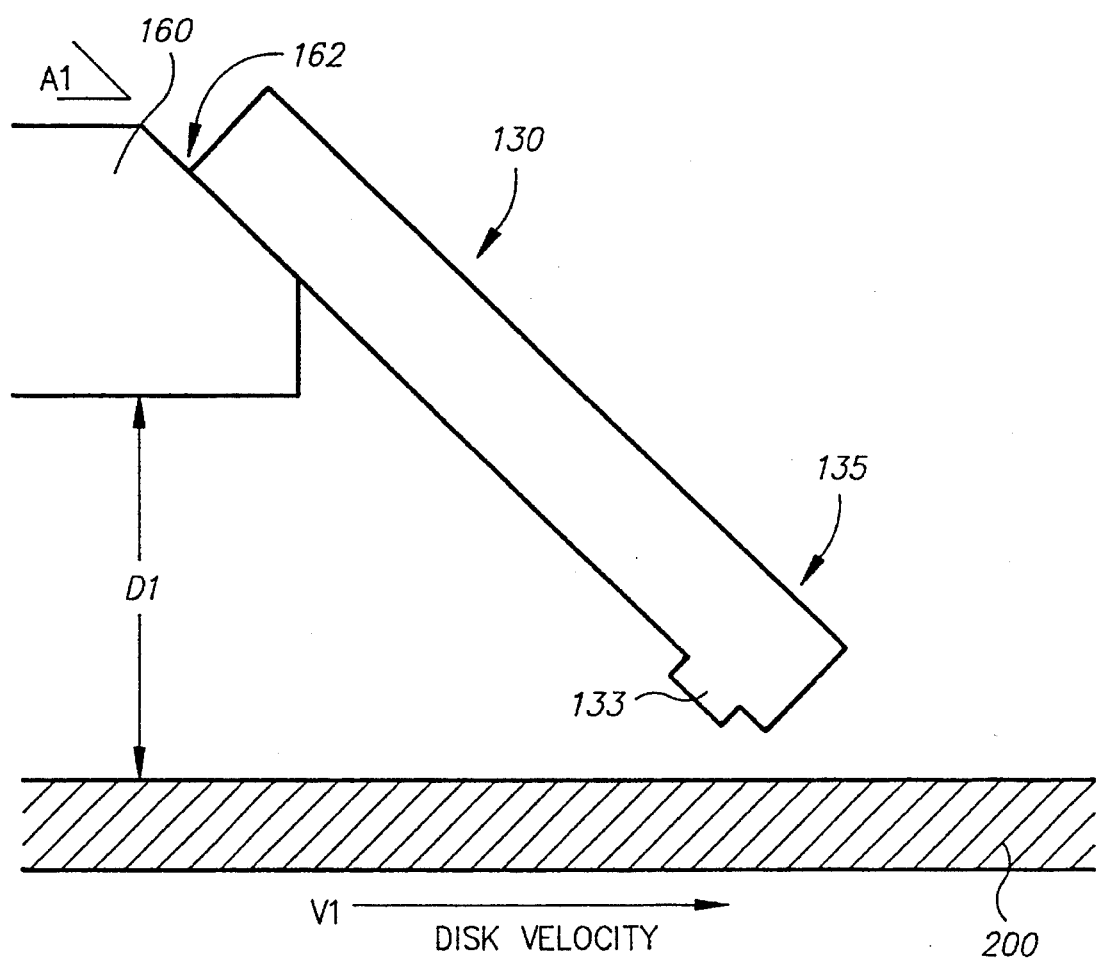
FIG. 4A is a cross-sectional view of a reed transducer/suspension assembly in an unloaded position above a media disk.

Referring now to FIG. 4A, the reed structure 130 of FIG. 3 is illustrated in its unloaded conventional mounting position above magnetic recording disk 200. The distance between the surface of the disk 200 and the bottom of the actuator 160 is exaggerated in the figure and is designated by reference D1. This distance is approximately 1 millimeter or greater. The direction of rotation of the disk media is indicated and designated by vector V1. The reed structure 130 is typically coupled to actuator assembly 160 by adhesive bonding to inclined surface 162. Inclined surface 162 forms an angle A1 with respect to the top surface of actuator 160. This angle is exaggerated in the figure and is approximately 5 degrees.

In operation of the disk file, actuator 160 would be lowered toward disk 200 to bring pad 133 into contact with disk 200. The compliance of reed structure 130, being approximately 0.5 Newtons/meter, is such that reed 130 can bend and allow pad 133 to become parallel to the surface of disk 200.

Figure 4B:
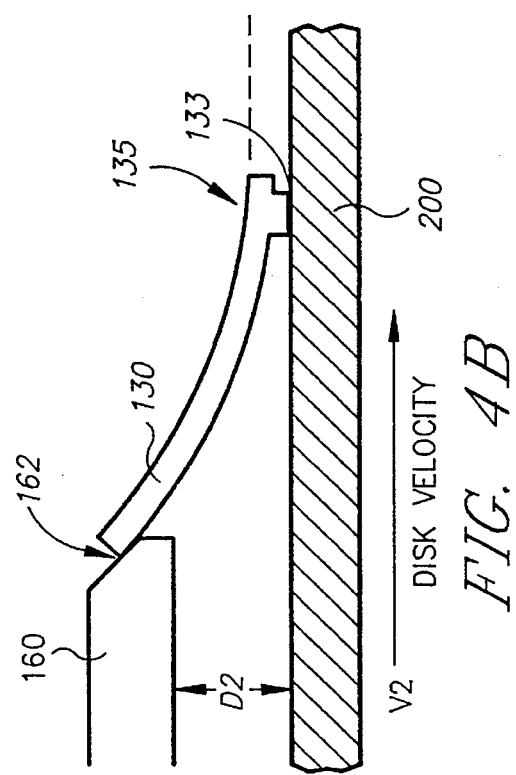
FIG. 4B is a cross-sectional view of a reed transducer/suspension assembly in contact with a media disk.

Turning now to FIG. 4B, the reed structure 130 of FIG. 3 is illustrated in its conventional mounting position in contact with a magnetic recording disk 200. The distance between the surface of the disk 200 and the bottom of the actuator 160 is exaggerated in the figure and is designated by reference D2. This distance is approximately 0.5 millimeters. The degree of curvature of reed 130 is also exaggerated. The direction of rotation of the disk media is indicated and designated by vector V2. The reed structure 130 is positioned so that pad 133 is in contact with the disk 200 and an area 135 above the pad 133 is generally parallel to the surface of disk 200. The static loading on reed 135, given the difference between D1 and D2 and the compliance of reed 130, is approximately 20 milligrams.

In operation the disk 200 rotates in the indicated direction and the pad 133 with an imbedded read/write transducer remains in contact with the disk 200. As discussed above, the structure of FIG. 4B has the problem of the reed structure 130 lifting off from the surface of the disk at high disk rotation rates. Air near the surface of the disk is moved by frictional forces in the same direction as the disk rotation. The air flow generated creates a lifting force on reed 130 and eventually this lift overcomes the static loading on the transducer/suspension assembly. If the rotation rate of disk 200 is increased to the point where the linear velocity of the disk reaches approximately 4 m/s at the point of contact, the lift-off forces overcome the static loading force and pad 133 separates from disk 200. At this point pad 133 becomes an air bearing surface.

Figure 5:
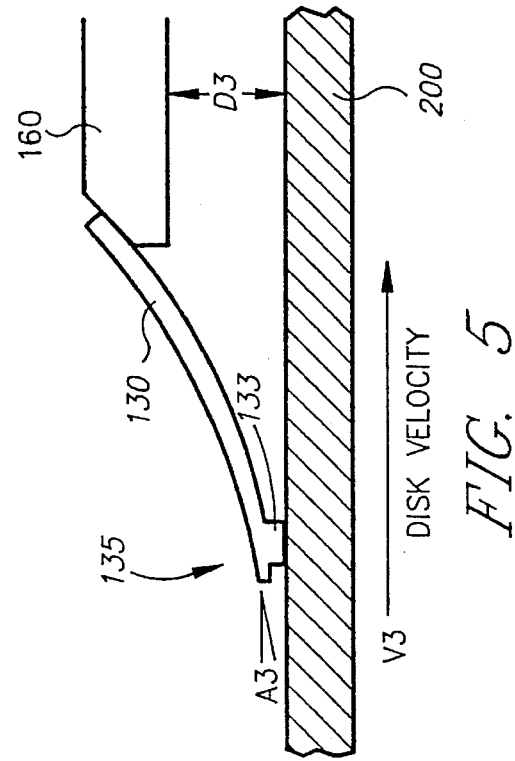
FIG. 5 is a cross-sectional view of one embodiment of a reed transducer/suspension assembly in contact with a media disk and mounted in accordance with the present invention.

Referring now to FIG. 5, the reed structure 130 of FIG. 3 is illustrated as mounted in accordance with one embodiment of the present invention in contact with a magnetic recording disk 200. The distance between the surface of the disk 200 and the bottom of the actuator 160 is exaggerated in the figure and is designated by reference letter D3. This distance is greater than D2 and is approximately 0.6 millimeters. The direction of rotation of the disk media is indicated and designated by vector V3. The reed structure 130 is coupled to actuator assembly 160, typically by adhesive bonding, and positioned so that pad 133 is in contact with the disk 200 and an area 135 above the pad 133 forms an angle A3 with respect to the surface of the disk.

In operation the disk 200 rotates in the indicated direction and the pad 133 with an imbedded read/write transducer remains in contact with the disk 200. In contrast to the prior art apparatus, the dynamic loading on a reed assembly mounted in accordance with the present invention increases as the rotational rate increases. This is caused by air flow directed against the top surface of the reed structure 130 in combination with a pressure differential created in the area below the reed 130. Therefore, the dynamic load urging the reed 130 towards the disk increases as the rotational speed of the disk increases. This counteracts the tendency of pad area 133 to become an air bearing surface at high rotation rates. The magnitude of the dynamic loading is strongly dependent upon the angle A3 formed between the disk surface and the top surface of the reed 130 at a point above the contact point. The larger this angle, the larger the dynamic force urging the reed 130 toward the disk. For example, when A3 is 0.5 degrees, the lift-off velocity of reed 130 is approximately 8 meters/second. When A3 has a value of one degree, the lift-off velocity exceeds 10 meters/second. This angle is controlled by varying the difference between the unloaded height of the actuator, D1 and the loaded height, D3. However, the bottom surface of pad area 133 must be substantially parallel to the disk 200 surface even though reed 130 is tilted at an angle with respect to the disk surface. There are several alternatives for achieving this result. One alternative is to lap the pad area so as to duplicate the angle A3 on the bottom surface. Alternatively, the angle could be formed by photolithographic techniques during the fabrication of the reed 130.

Figure 6:
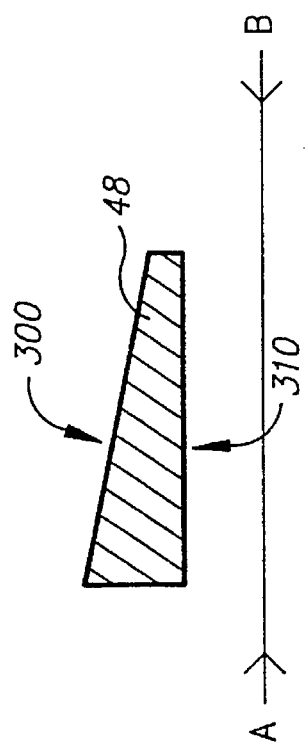
FIG. 6 is a cross-sectional view taken along section line A-B of FIG. 2 of an alternate embodiment of the reed transducer/suspension assembly of the present invention.

Referring now to FIG. 6, the cross-section of an alternative embodiment of the reed structure 48 of FIG. 3 is illustrated. The cross-section displayed is taken along section line A-B of FIG. 2. In this embodiment, the cross section of reed structure 130 is modified so as to form a taper. In the case where the reed 48 is composed of a dielectric material such as aluminum oxide ($Al_2O_3$) or silicon dioxide ($SiO_2$), the taper could be produced by lapping, grinding, or etching techniques as are known in the art. The reed 48 of FIG. 6 is oriented so that bottom surface 310 is adjacent to the disk surface during operation of the disk file. The purpose of the shaped cross-section is to maintain a constant dynamic load as the actuator moves from the outside diameter of the disk to the inside diameter. When the actuator arm 54 is accessing an inside data track, the relative velocity of the disk surface is lower at the contact point. This results in less of a dynamic load on a reed assembly mounted in accordance with the present invention. Therefore, the taper is added to reed 48 so as to create an additional dynamic load caused by air flowing over surface 300. Optionally, the cross section could be varied along the length of the reed 48 to optimize the dynamic loading at various diameters.

Although the present invention has been described in considerable detail with reference to certain preferred versions thereof, other versions are possible. For example, the present invention could have benefits when used with any integrated transducer/suspension assembly designed for low static load contact recording. Similarly, although the invention has been described in the context of rotary actuators, it would be apparent to one skilled in the art that the present invention would have benefits in a disk file that utilized linear actuators and positioned reed assemblies perpendicular to the actuator's line of travel. It should be apparent that other modifications and adaptations of the described embodiments may occur to one skilled in the art without departing from the scope of the present invention as set forth in the following claims.

We claim:

1. A contact recording disk drive assembly comprising:

a housing;

at least one rigid data storage disk rotatably mounted in said housing;

an actuator arm positioned in said housing in proximity to said data storage disk;

a suspension assembly shaped to have a pad portion and having a distal and a proximal end, said distal end of said suspension forming a small, non-zero angle of less than five degrees with respect to the surface of said data storage disk, said pad portion located on said distal end of said suspension assembly and positioned for contact with said data storage disk, said proximal end of said suspension assembly coupled to said actuator arm;

a transducer located at said distal end of said suspension assembly, for reading and writing data on said data storage disk; and means for rotating said data storage disk in said housing to move a point on said disk in a direction substantially from said distal end of said suspension assembly to said proximal end of said suspension assembly, such that when air generated by the rotation of said data storage disk impinges on said small angle of said distal end of said suspension assembly, said pad portion is in contact with said data storage disk.

2. A contact recording disk drive assembly according to claim 1, wherein said actuator arm is a rotary actuator arm.

3. A contact recording disk drive assembly according to claim 1 wherein said small angle is more than 0.5 and less than five degrees.

4. A contact recording disk drive assembly according to claim 1, wherein said small angle is more than 0.5 and less than two degrees.

* * * * *